US012537363B2

(12) United States Patent
Kuo et al.

(10) Patent No.: US 12,537,363 B2
(45) Date of Patent: Jan. 27, 2026

(54) PHOTONIC CRYSTAL SURFACE-EMITTING LASER DEVICE AND OPTICAL SYSTEM

(71) Applicant: HON HAI PRECISION INDUSTRY CO., LTD., New Taipei (TW)

(72) Inventors: Hao-Chung Kuo, New Taipei (TW); Kuo-Bin Hong, New Taipei (TW); Shih-Chen Chen, New Taipei (TW); Kuo-Fong Tseng, New Taipei (TW); Tzu-Hsiang Lan, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 636 days.

(21) Appl. No.: 17/971,790

(22) Filed: Oct. 24, 2022

(65) Prior Publication Data

US 2023/0139244 A1    May 4, 2023

(30) Foreign Application Priority Data

Oct. 28, 2021   (TW) .................... 110140177

(51) Int. Cl.
*H01S 5/11*   (2021.01)
*H01S 5/18*   (2021.01)
*H01S 5/42*   (2006.01)

(52) U.S. Cl.
CPC ............... *H01S 5/11* (2021.01); *H01S 5/18* (2013.01); *H01S 5/42* (2013.01)

(58) Field of Classification Search
CPC ............ H01S 5/11; H01S 5/185–187; H01S 5/04253; H01S 5/18386–18394
See application file for complete search history.

(56) References Cited

U.S. PATENT DOCUMENTS

| | | | | | |
|---|---|---|---|---|---|
| 6,154,480 | A | * | 11/2000 | Magnusson | H01S 5/18361 372/98 |
| 7,693,205 | B2 | * | 4/2010 | Uchida | B82Y 20/00 372/50.124 |
| 7,873,090 | B2 | * | 1/2011 | Onishi | H10F 77/147 372/50.12 |

(Continued)

FOREIGN PATENT DOCUMENTS

| CN | 108701964 A | * | 10/2018 | ......... H01S 5/04254 |
|---|---|---|---|---|
| CN | 109860050 A | | 6/2019 | |

(Continued)

*Primary Examiner* — Joshua King
(74) *Attorney, Agent, or Firm* — ScienBiziP, P.C.

(57) ABSTRACT

A photonic crystal surface-emitting laser device includes a substrate, a light emitting layer located on a surface of the substrate, a photonic crystal layer located on a side of the light emitting layer facing away from the substrate, and a metasurface located on a side of the substrate facing away from the photonic crystal layer. The light emitting layer is configured to generate photons. The photons incident into the photonic crystal layer generate laser light through a Bragg diffraction oscillation. The metasurface includes a base and a plurality of pillars arranged on a surface of the base at intervals, at least two of the plurality of pillars have different shapes and/or different sizes. The metasurface is configured to receiving the laser light, diffracting the laser light and then emitting the laser light. An optical system having the photonic crystal surface-emitting laser device is also provided.

18 Claims, 9 Drawing Sheets

(56) References Cited

U.S. PATENT DOCUMENTS

| | | | |
|---|---|---|---|
| 8,217,410 B2* | 7/2012 | Ma | H01S 5/18366 |
| | | | 257/98 |
| 9,088,133 B2* | 7/2015 | Noda | H01S 5/1234 |
| 9,093,819 B2* | 7/2015 | Fattal | H01S 5/18363 |
| 10,916,916 B2* | 2/2021 | Na | H01S 5/02469 |
| 2006/0125100 A1 | 6/2006 | Arakawa | |
| 2006/0245464 A1* | 11/2006 | Hori | H01S 5/183 |
| | | | 372/99 |
| 2007/0121694 A1* | 5/2007 | Okamoto | B82Y 20/00 |
| | | | 372/50.124 |
| 2007/0153860 A1* | 7/2007 | Chang-Hasnain | G02B 5/1809 |
| | | | 359/558 |
| 2007/0201526 A1* | 8/2007 | Hori | H01S 5/18308 |
| | | | 372/98 |
| 2007/0201527 A1* | 8/2007 | Hori | H01S 5/18333 |
| | | | 372/102 |
| 2007/0242715 A1* | 10/2007 | Gustavsson | H01S 5/18355 |
| | | | 372/45.01 |
| 2008/0026564 A1 | 1/2008 | Frohberg et al. | |
| 2008/0107145 A1* | 5/2008 | Hori | B82Y 20/00 |
| | | | 372/99 |
| 2008/0192779 A1* | 8/2008 | Ikuta | H01S 5/0683 |
| | | | 372/7 |
| 2009/0035884 A1* | 2/2009 | Ikuta | H01S 5/34326 |
| | | | 257/E21.001 |
| 2009/0262775 A1* | 10/2009 | Uchida | H01S 5/32341 |
| | | | 372/50.124 |
| 2010/0128749 A1* | 5/2010 | Amann | H01S 5/18308 |
| | | | 257/E21.085 |
| 2010/0238966 A1* | 9/2010 | Mochizuki | H01S 5/1835 |
| | | | 372/99 |
| 2011/0158280 A1* | 6/2011 | Nagatomo | H01S 5/2027 |
| | | | 372/50.1 |
| 2011/0216796 A1* | 9/2011 | Nagatomo | H01S 5/18 |
| | | | 372/45.01 |
| 2012/0063480 A1* | 3/2012 | Nagatomo | H01S 5/11 |
| | | | 372/41 |
| 2012/0063481 A1* | 3/2012 | Nagatomo | H01S 5/185 |
| | | | 372/44.011 |
| 2014/0211822 A1* | 7/2014 | Fattal | H01S 5/11 |
| | | | 372/45.01 |
| 2014/0348195 A1* | 11/2014 | Sakaguchi | H01S 5/11 |
| | | | 372/45.01 |
| 2014/0355635 A1* | 12/2014 | Iwahashi | H01S 5/11 |
| | | | 372/45.01 |
| 2015/0010034 A1* | 1/2015 | Chang-Hasnain | H01S 5/32 |
| | | | 372/50.124 |
| 2015/0288146 A1* | 10/2015 | Chang-Hasnain | H01S 5/18319 |
| | | | 438/27 |
| 2017/0160473 A1* | 6/2017 | Mazur | G02B 6/136 |
| 2017/0271849 A1* | 9/2017 | Saito | H01S 5/185 |
| 2018/0178571 A1 | 6/2018 | Zhu et al. | |
| 2018/0278023 A1* | 9/2018 | Na | H01S 5/02469 |
| 2019/0074663 A1* | 3/2019 | Saito | H01S 5/11 |
| 2019/0164842 A1 | 5/2019 | Lee et al. | |
| 2019/0252855 A1* | 8/2019 | Lu | H01S 5/2059 |
| 2019/0305107 A1 | 10/2019 | Chen et al. | |
| 2019/0371965 A1* | 12/2019 | Na | G06T 7/521 |
| 2020/0025888 A1* | 1/2020 | Jang | G01S 7/4861 |
| 2020/0067278 A1* | 2/2020 | Han | H01S 5/18311 |
| 2021/0143610 A1* | 5/2021 | Pan | H01S 5/3211 |
| 2021/0273411 A1* | 9/2021 | Uenoyama | H01S 5/185 |
| 2022/0320827 A1* | 10/2022 | Chen | H01S 5/183 |
| 2023/0055037 A1* | 2/2023 | Lu | H01S 5/0225 |

FOREIGN PATENT DOCUMENTS

| | | | | |
|---|---|---|---|---|
| CN | 110488315 A | | 11/2019 | |
| JP | 2018029098 A | * | 2/2018 | H01S 5/04253 |
| JP | 6580097 B2 | * | 9/2019 | H01S 5/0425 |
| KR | 20200022312 A | * | 3/2020 | H01S 5/187 |
| TW | 202007031 A | | 2/2020 | |
| TW | M615662 U | | 8/2021 | |
| WO | WO-2007065005 A2 | * | 6/2007 | H01S 5/18 |
| WO | WO-2010087231 A1 | * | 8/2010 | H01S 5/187 |
| WO | WO-2022193076 A1 | * | 9/2022 | |

\* cited by examiner

PHOTONIC CRYSTAL SURFACE-EMITTING LASER DEVICE AND OPTICAL SYSTEM

FIELD

The subject matter herein generally relates to a field of laser detection technology, and more particularly, to a photonic crystal surface-emitting laser device and an optical system having the photonic crystal surface-emitting laser device.

BACKGROUND

Photonic Crystal Surface-Emitting Laser (shorted as PCSEL) devices have the advantages of good beam quality, small size, low energy consumption, easy integration, and high reliability, and are widely used in scanning lidar systems (shorted as LiDAR). The photonic crystal surface emitting laser device in the traditional LiDAR includes a diffraction grating to control the emission angle of the laser light. However, the traditional diffraction grating has a single control over the emission angle of the laser beam, and it is easy to generate multiple laser spots with symmetrical distribution at the same time, which is not conducive to beam scanning.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
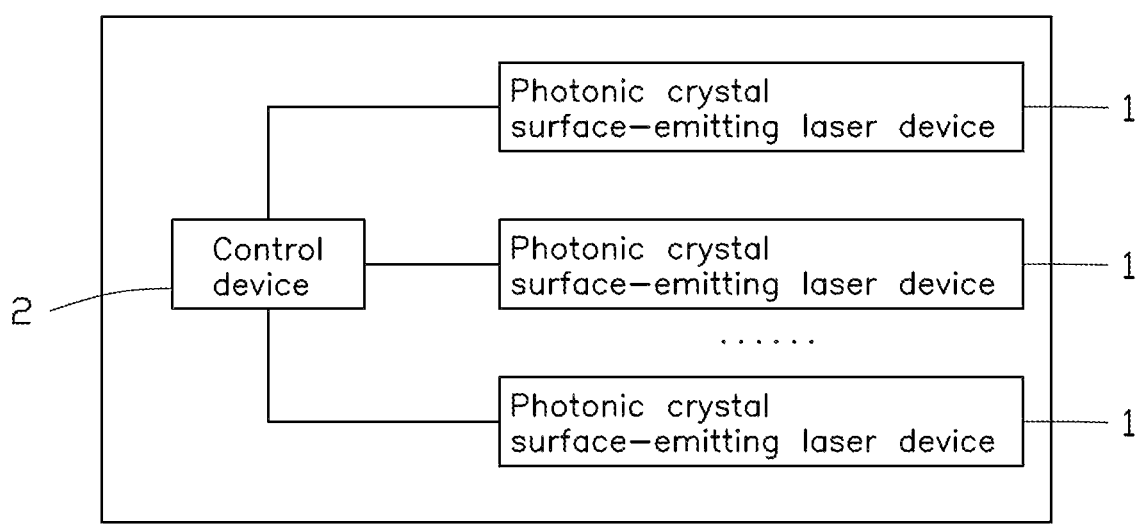
FIG. 1 is a schematic diagram of an embodiment of an optical system according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIG. 1 illustrates an embodiment of an optical system 100. The optical system 100 includes a plurality of photonic crystal surface-emitting laser devices 1. The optical system 100 may be a face recognition sensing device or a lidar, which may be applied to various consumer electronic devices such as smart phones, augmented reality (AR) glasses, or virtual reality (VR) glasses, and may be applied to automobiles, household equipment, or medical equipment, and may also be applied to unmanned carrier in smart chemical factories or automated warehousing. When the photonic crystal surface-emitting laser devices 1 are applied to the above-mentioned various optical systems 100, the photonic crystal surface-emitting laser devices 1 are configured to emit laser light according to a driving signal, so that the optical systems 100 can realize functions such as three-dimensional image sensing and flight ranging.

The optical system 100 further includes a control device 2 electrically connected to each of the plurality of photonic crystal surface-emitting laser devices 1. The control device 2 is configured to output a driving signal to each of the plurality of photonic crystal surface-emitting laser devices 1. In at least one embodiment, the control device 2 may include, but not limited to, a chip, a chip set or a control motherboard. The plurality of photonic crystal surface-emitting laser devices 1 are arranged into a laser emitting array, and each of the plurality of photonic crystal surface-emitting laser devices 1 is independently controlled by the control device 2 to be in an on state or in an off state. Each of the plurality of photonic crystal surface-emitting laser devices 1 emits laser light when it is in the on state, and does not emit laser light when it is in the off state. In the laser emitting array, at least two of the plurality of photonic crystal surface-emitting laser devices 1 emit laser light in different directions.

During a working period, the control device 2 controls one or more photonic crystal surface-emitting laser devices 1 to turn on according to a direction, a distance or a size of the objected to be detected. By changing a working state (on or off) of each of the plurality of photonic crystal surface-emitting laser devices 1 in different working periods, a direction and a shape of the laser light emitted by the laser emitting array in different working periods can be changed.

Figure 2:
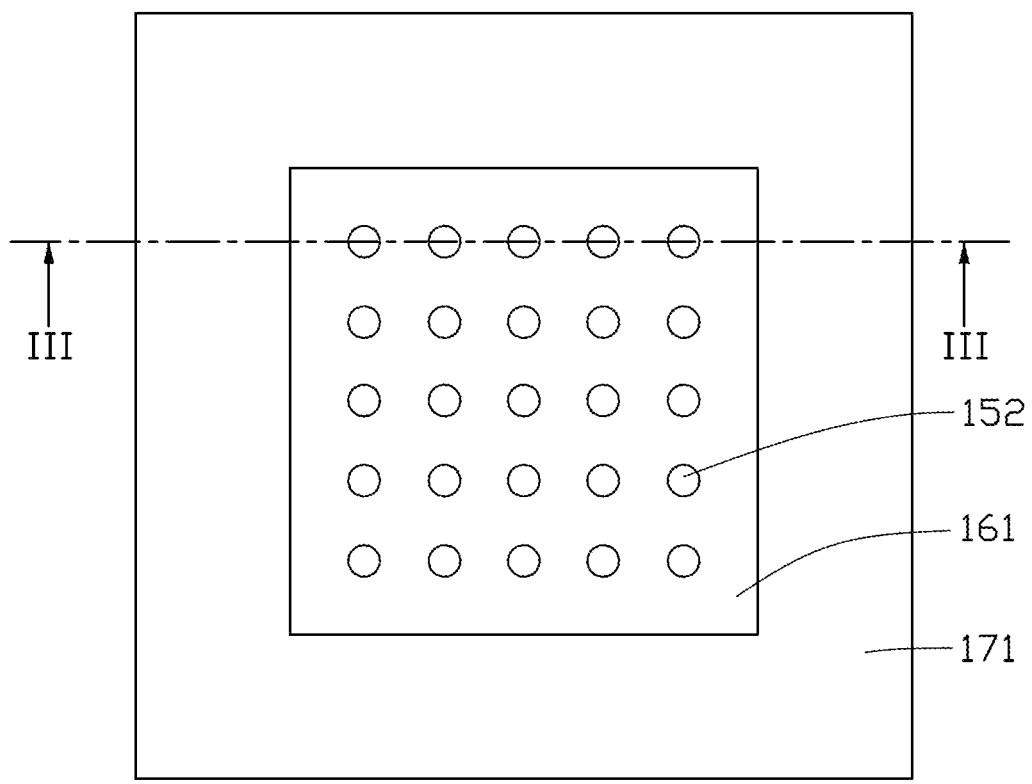
FIG. 2 is a diagram of an embodiment of a photonic crystal surface-emitting laser device according to the present disclosure.
Figure 3:
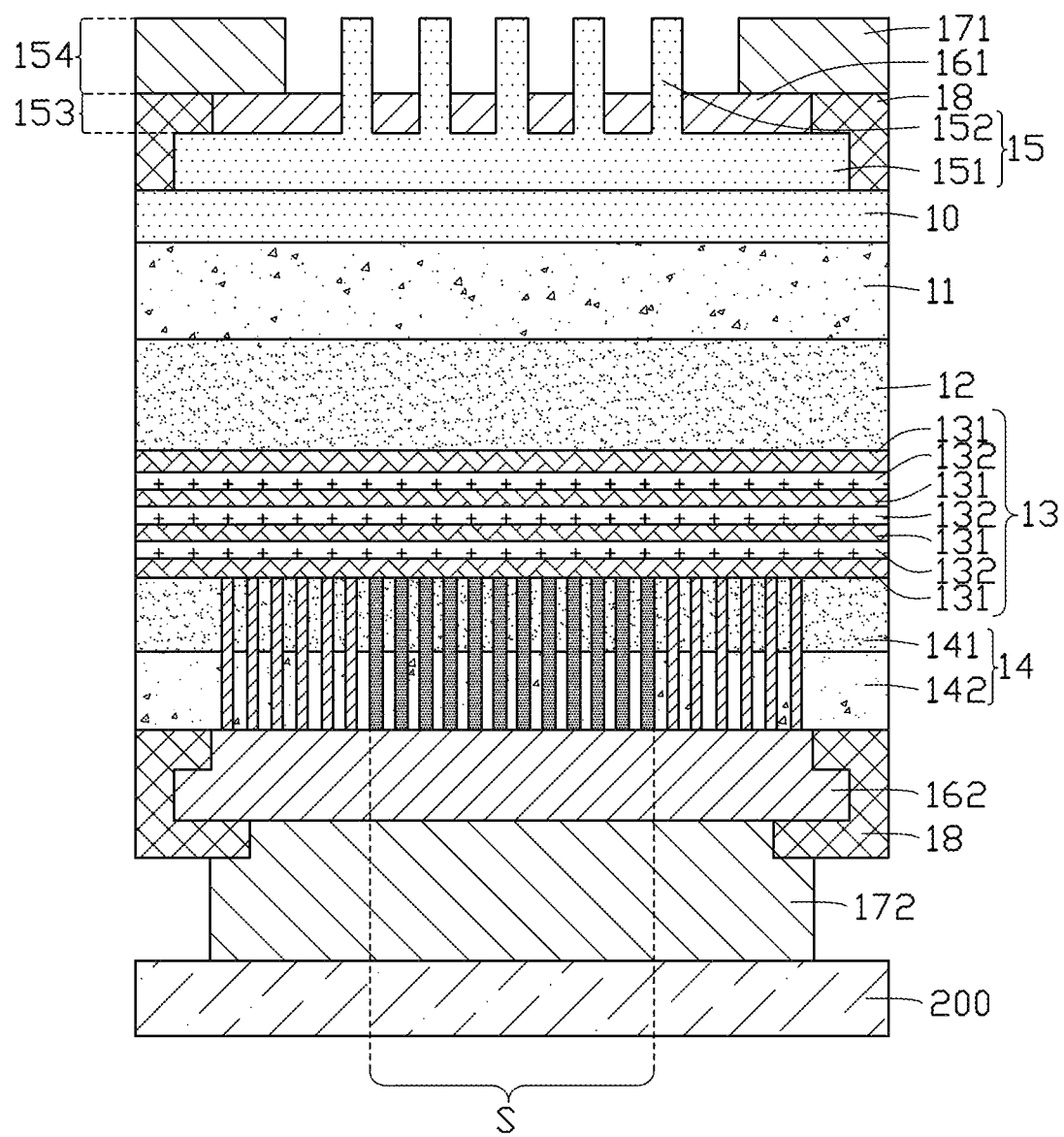
FIG. 3 is a cross-sectional view of the photonic crystal surface-emitting laser device taken along III-III line of FIG. 2.

Referring to FIGS. 2 and 3, each of the plurality of photonic crystal surface-emitting laser devices 1 includes a substrate 10, a buffer layer 11, a first cladding layer 12, a light emitting layer 13, and a photonic crystal layer 14 that are stacked in sequence. In at least one embodiment, the buffer layer 11 may be omitted. In at least one embodiment, the first cladding layer 12 may be omitted.

The substrate 10 is an insulating substrate for carrying and growing the buffer layer 11, the first cladding layer 12, the light emitting layer 13, and the photonic crystal layer 14. The substrate 10 may made of n-type gallium arsenide. In at least one embodiment, the buffer layer 11 may be made of n-type gallium arsenide.

The light emitting layer 13 includes a plurality of quantum well light-emitting layers 131 and a plurality of energy barrier layers 132. The plurality of quantum well light-emitting layers 131 and the plurality of energy barrier layers 132 are stacked alternately. That is, one of the plurality of quantum well light-emitting layers 131 and one of the plurality of energy barrier layers 132 are stacked alternately. In at least one embodiment, the light emitting layer 13 includes three to five quantum well light-emitting layers 131 and four to six energy barrier layers 132 that are alternately stacked. Each of the quantum well light-emitting layers 131 may be made of indium gallium arsenide, and each of the energy barrier layers 132 may be made of gallium arsenide. In at least one embodiment, the quantum well light-emitting layer 131 may be made of AlGaAs or InGaAsP, and the energy barrier layer 132 may be made of AlGaAs or AlGaInAs.

The light emitting layer 13 is configured to generate photons driven by the driving signal. The photons generated by the light emitting layer 13 propagate in all directions. The photons are incident into the photonic crystal layer 14 and generate a Bragg diffraction oscillation in the photonic crystal layer 14, and until the photonic crystal surface-emitting laser device 1 reaches a balance state of gain and loss, the photons incident into the photonic crystal layer 14 generates laser light. In at least one embodiment, a wavelength of the laser light emitted by the photonic crystal surface-emitting laser device 1 is in a range of 905 nm to 1550 nm (including the end value).

The photonic crystal layer 14 includes an ohmic contact layer 141 and a second cladding layer 142 stacked on the ohmic contact layer 141. The second cladding layer 142 is located between the ohmic contact layer 141 and the light emitting layer 13. In at least one embodiment, the ohmic contact layer 141 may be made of p-type gallium arsenide. In at least one embodiment, the ohmic contact layer 141 may be made of indium phosphide or indium gallium arsenide phosphide.

In at least one embodiment, the first cladding layer 12 may be made of n-type AlGaAs, the second cladding layer 142 may be p-type AlGaAs. The first cladding layer 12 cooperates with the second cladding layer 142 to lock the photons generated by the light emitting layer 13, thereby reducing the propagation of the photons toward the photonic crystal layer 14. In at least one embodiment, the first cladding layer 12 and the second cladding layer 142 may be respectively made of AlInAs, InP or gallium arsenide phosphide.

Figure 4:
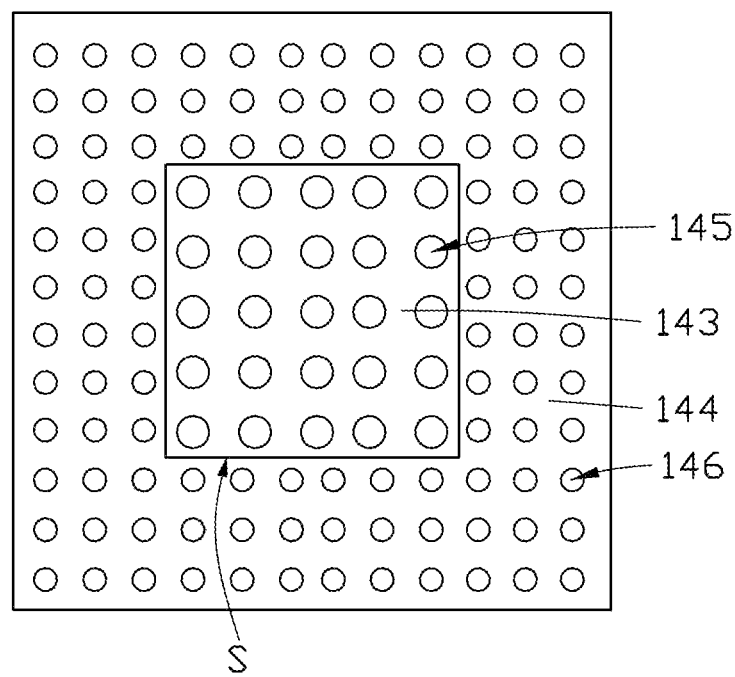
FIG. 4 is a diagram of an embodiment of a photonic crystal layer according to the present disclosure.

Referring to FIG. 4, the photonic crystal layer 14 includes a first photonic crystal region 143 and a second photonic crystal region 144 surrounding a periphery of the first photonic crystal region 143. Photons incident into the first photonic crystal region 143 to generate laser light through a Bragg diffraction oscillation. The second photonic crystal region 144 is configured to reflect the received photons to the first photonic crystal region 143, so as to reduce photon loss and improve the luminous efficiency of the photonic crystal surface-emitting laser device 1.

A plurality of first through holes 145 arranged at intervals are defined in the first photonic crystal region 143, and a plurality of second through holes 146 arranged at intervals are defined in the second photonic crystal region 144. Each of the plurality of first through holes 145 penetrates the ohmic contact layer 141 and the second cladding layer 142, and each of the plurality of second through holes 146 penetrates the ohmic contact layer 141 and the second cladding layer 142. The plurality of first through holes 145 and the plurality of second through holes 146 may be both circular through holes. Diameters of the plurality of first through holes 145 may be the same, and diameters of the plurality of second through holes 146 may be the same. The diameter of each of the plurality of first through holes 145 is greater than the diameter of each of the plurality of second through holes 146, an energy position of a selected mode in a reciprocal space of the first photonic crystal region 143 is not aligned with an energy position of the same mode in a reciprocal space of the second photonic crystal region 144. So that the resonant wavelength of the first photonic crystal region 143 can fall within the energy gap of the second photonic crystal region 144. As a result, the second photonic crystal region 144 can be used as a reflecting mirror in the horizontal direction to reflect photons to the first photonic crystal region 143 to generate laser light through the Bragg diffraction oscillation. In at least one embodiment, each of the plurality of first through holes 145 and each of the plurality of second through holes 146 may be, but not limited to, oval, triangular, quadrangular, L-shaped, V-shaped. In the present disclosure, a shape of the first through hole 145 refers to a shape of an opening of the first through hole 145 on the photonic crystal layer 14, and a shape of the second through hole 146 refers to a shape of an opening of the second through hole 146 on the photonic crystal layer 14.

An area where the photonic crystal surface-emitting laser device 1 can emit laser light is defined as a light-emitting area S. In at least one embodiment, an area where the first photonic crystal region 143 is located is the light-emitting area S.

One the one hand, the smaller the area occupied by the first photonic crystal region 143 is, the smaller the driving signal threshold is, that is, the smaller the current threshold required to drive the photonic crystal surface-emitting laser device 1 to emit laser light is. The smaller the current threshold is, the shorter the time required to reach the current threshold is, which is beneficial to improve the operation speed of the photonic crystal surface-emitting laser device 1.

On the other hand, the smaller the area occupied by the first photonic crystal region 143 is, the smaller the light-emitting area of the photonic crystal surface-emitting laser device 1 is. The smaller the light-emitting area of a single photonic crystal surface-emitting laser device 1 is, the more the number of the photonic crystal surface-emitting laser devices 1 that can be accommodated by the laser emitting array of the same area is. The more the number of the photonic crystal surface-emitting laser devices 1 in the laser emitting array is, the more diverse the directions and shapes of the laser light emitted by the laser emitting array.

In the present disclosure, the photonic crystal layer 14 includes the first photonic crystal region 143 and the second photonic crystal region 144, and the first photonic crystal region 143 emits laser light, which is beneficial to reduce the light-emitting area S of the photonic crystal surface-emitting laser devices 1, thereby facilitating the improvement of the operating speed of the photonic crystal surface-emitting laser devices 1, and facilitating the diversification of the directions and shapes of the laser light emitted by the laser emitting array applying the photonic crystal surface-emitting laser device 1.

Figure 5:
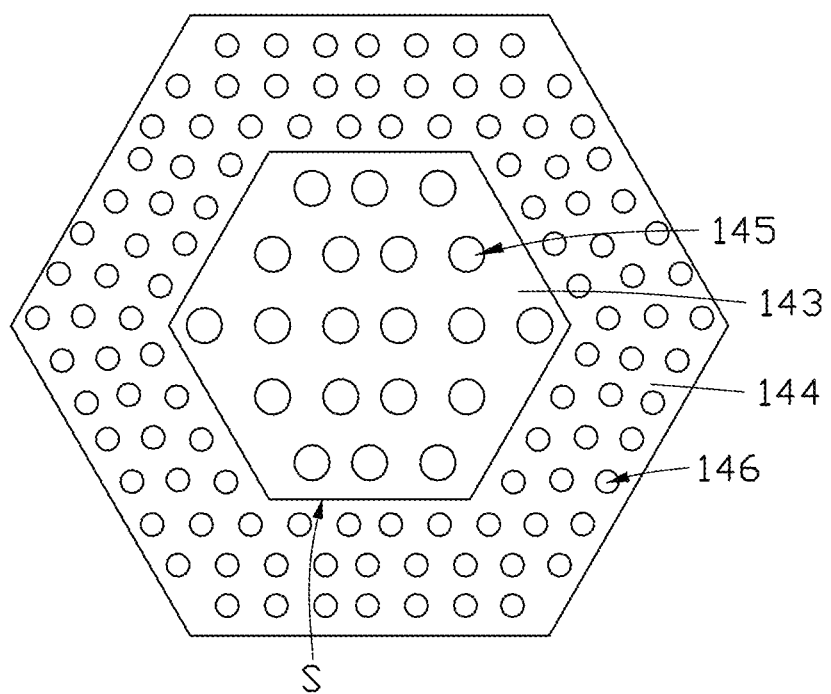
FIG. 5 is a diagram of an embodiment of a photonic crystal layer according to the present disclosure.

Referring to FIG. 4, in at least one embodiment, the first photonic crystal region 143 may be a rectangle, and the second photonic crystal region 144 may be a rectangular frame surrounding the first photonic crystal region 143. Referring to FIG. 5, in at least one embodiment, the first photonic crystal region 143 may be a hexagon, and the second photonic crystal region 144 may be a hexagonal frame surrounding the first photonic crystal region 143. In at least one embodiment, the first photonic crystal region 143 may be a circle, and the second photonic crystal region 144 may be a circular frame. In the present disclosure, a shape of the first photonic crystal region 143 refers to a shape of an orthographic projection of the first photonic crystal region 143 on the substrate 10, a shape of the second photonic crystal region 144 refers to a shape of an orthographic projection of the second photonic crystal region 144 on the substrate 10.

The shape of the first photonic crystal region 143 depends on a lattice type of a photonic crystal material in the photonic crystal layer 14. For example, when the lattice type of the photonic crystal material is triangular lattice or honeycomb lattice, the first photonic crystal region 143 is hexagonal; when the lattice type of the photonic crystal material is square lattice, the first photonic crystal region 143 is quadrilateral (or rectangle).

Referring to FIG. 3, in at least one embodiment, the photonic crystal surface-emitting laser device 1 further includes a metasurface 15. The metasurface 15 is located on a surface of the substrate 10 facing away from the photonic crystal layer 14. The laser light generated by the photonic crystal layer 14 is diffracted by the metasurface 15 and then exits from a side of the metasurface 15 facing away from the photonic crystal layer 14.

The photonic crystal layer 14 is arranged opposite to the metasurface 15, that is, at least a portion of an orthographic projection of the photonic crystal layer 14 on the light emitting layer 13 overlaps an orthographic projection of the metasurface 15 on the light emitting layer 13. In at least one embodiment, the orthographic projection of the photonic crystal layer 14 on the light emitting layer 13 completely overlaps the orthographic projection of the metasurface 15 on the light emitting layer 13. In at least one embodiment, the orthographic projection of the metasurface 15 on the light emitting layer 13 may completely cover the orthographic projection of the photonic crystal layer 14 on the light emitting layer 13. In this way, the laser light generated by the photonic crystal layer 14 may be incident into the metasurface 15 as much as possible, and the utilization rate of the laser light may be improved.

Figure 6:
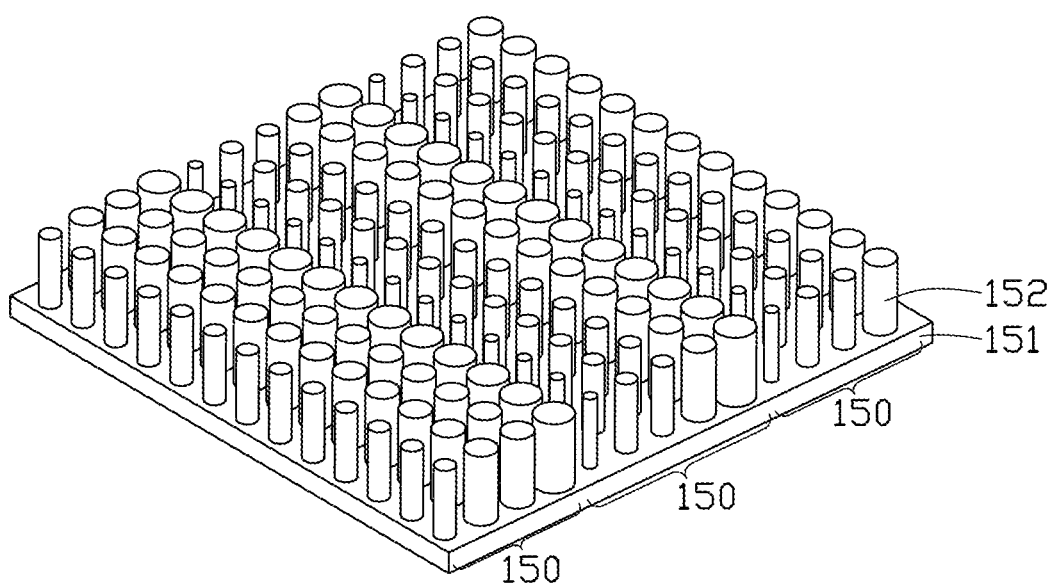
FIG. 6 is a diagram of an embodiment of a metasurface according to the present disclosure.

Referring to FIG. 6, the metasurface 15 includes a base 151 and a plurality of pillars 152 protruding from one surface of the base 151. The plurality of pillars 152 are arranged at intervals. Another surface of the base 151 facing away from the surface having the pillars 152 is in direct contact with the surface of the substrate 10. The base 151 and the plurality of pillars 152 are made of the same material, and the base 151 and the plurality of pillars 152 are integrally formed. The plurality of pillars 152 are formed by etching a plate including the base 151. In at least one embodiment, the metasurface 15 and the substrate 10 are made of the same material.

Each of the plurality of pillars 152 may be a cylinder. In at least one embodiment, distances between any two adjacent pillars 152 may be the same. In at least one embodiment, the distances between any two adjacent pillars 152 may be not all the same, that is, the distances between some adjacent pillars 152 may be different, and the distances between some adjacent pillars 152 may be the same. In at least one embodiment, diameters and/or heights of any two pillars 152 are different. The plurality of pillars 152 on the base 151 are divided into a plurality of diffraction units 150, and each of the plurality of diffraction units 150 includes a plurality of adjacently arranged pillars 152 to diffract the received laser light.

Figure 7A:
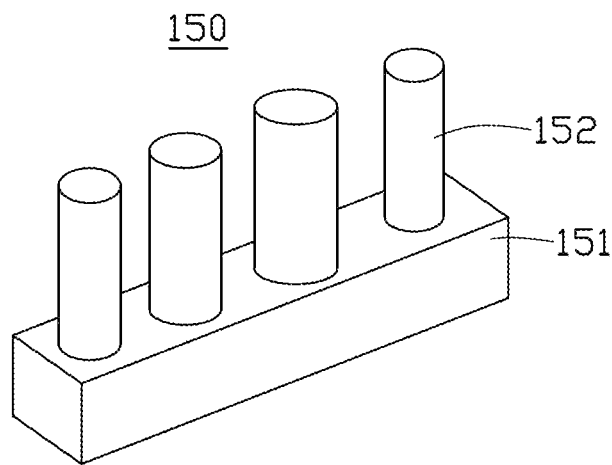
FIG. 7A is a diagram of an embodiment of a diffraction unit according to the present disclosure.
Figure 7B:
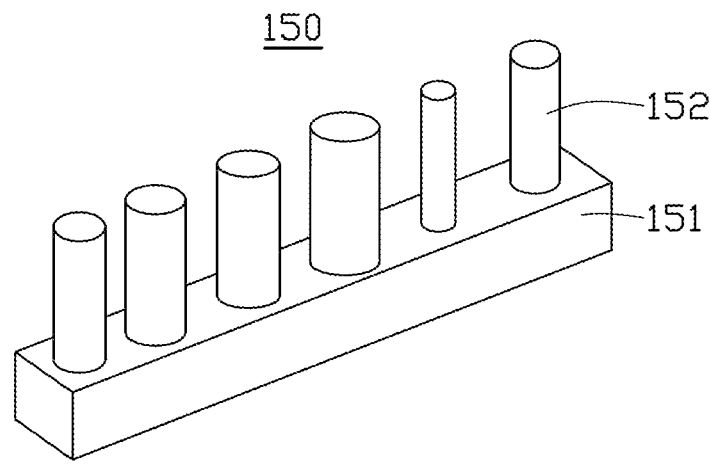
FIG. 7B is a diagram of an embodiment of a diffraction unit according to the present disclosure.
Figure 7C:
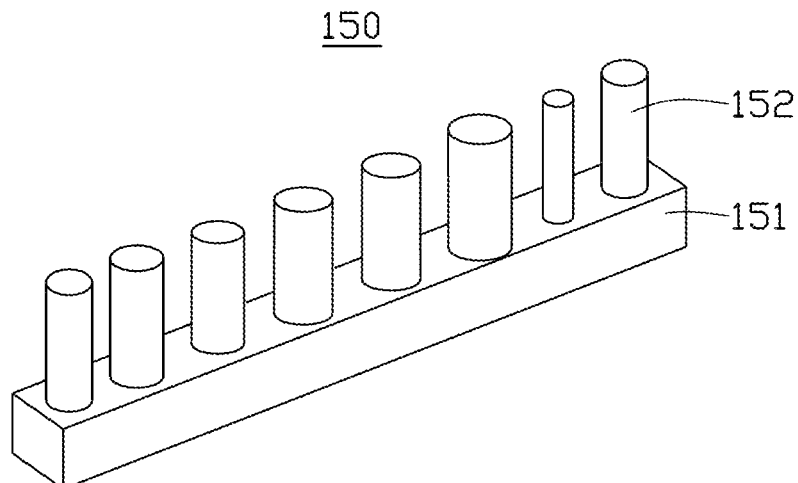
FIG. 7C is a diagram of an embodiment of a diffraction unit according to the present disclosure.
Figure 8:
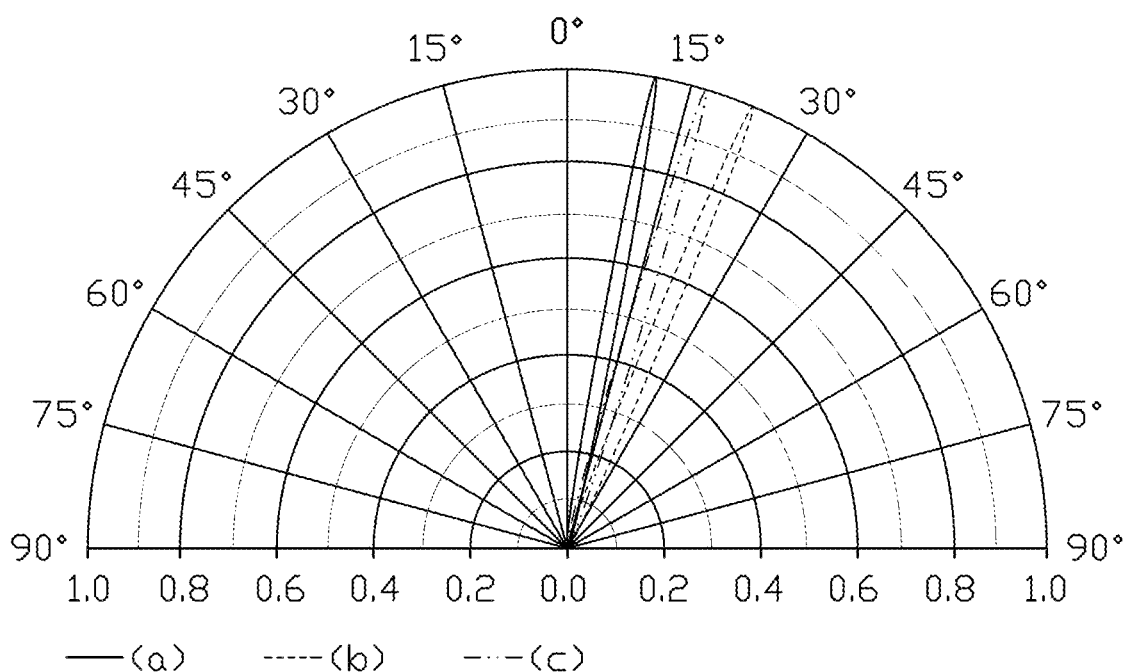
FIG. 8 is a diagram of an embodiment of emission angles of the laser light diffracted by the diffraction unit of FIGS. 7A, 7B, and 7C.

FIGS. 7A, 7B, and 7C are illustrated several embodiments of structures of the diffraction units 150. FIG. 8 is illustrated an embodiment of emission directions of the laser light diffracted by the diffraction units 150 of FIGS. 7A, 7B, and 7C. The emission direction may also be called an emission angle, and a direction perpendicular to the metasurface 15 is taken as the 0° direction. Therefore, the emission direction of the laser light diffracted and emitted by the metasurface 15 can be changed by changing the size (including diameter, height, etc.), the shape, and the quantity of each of the pillars of each of the diffraction units 150.

Further, since the emission direction of the laser light can be changed by the metasurface 15, when the metasurface 15 controls the laser light to concentrate in a certain direction, it is equivalent to converging the laser light. In at least one embodiment, the laser light finally emitted by the metasurface 15 can form a single light spot or a plurality of light spots through the convergence of the laser light by the metasurface 15. According to the degree of the convergence of the laser light, a size of the light spot can be controlled. Therefore, the number and the size of the spots formed by the laser light can be changed by changing the size (including diameter, height, etc.), the shape, and the quantity of each of the pillars of each of the diffraction units 150.

Figure 9A:
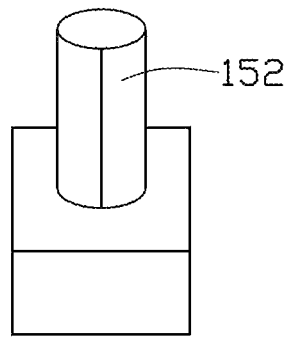
FIG. 9A is a diagram of an embodiment of a pillar according to the present disclosure.
Figure 9B:
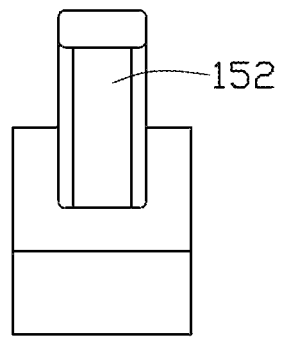
FIG. 9B is a diagram of an embodiment of a pillar according to the present disclosure.
Figure 9C:
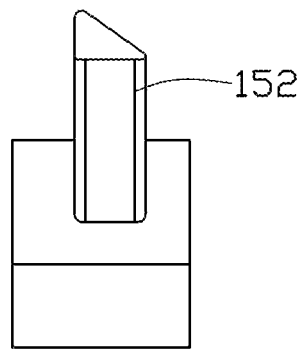
FIG. 9C is a diagram of an embodiment of a pillar according to the present disclosure.
Figure 9D:
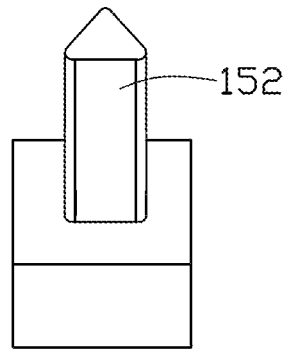
FIG. 9D is a diagram of an embodiment of a pillar according to the present disclosure.
Figure 9E:
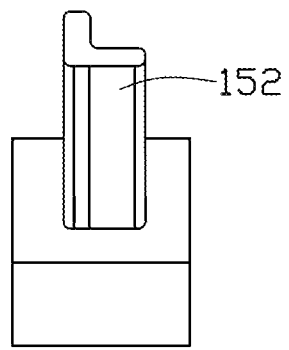
FIG. 9E is a diagram of an embodiment of a pillar according to the present disclosure.
Figure 9F:
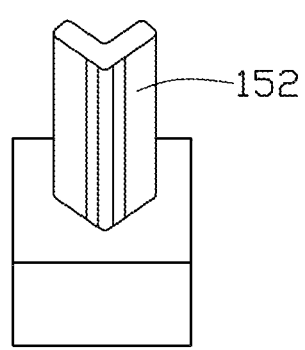
FIG. 9F is a diagram of an embodiment of a pillar according to the present disclosure.

In at least one embodiment, each of the pillars 152 may be a column of other shapes. For example, the pillar 152 may be an elliptical cylinder shown in FIG. 9A, a quadrangular prism shown in FIG. 9B, a triangular prism shown in FIG. 9C or FIG. 9D, a L-shaped cylinder shown in FIG. 9E, a V-shaped cylinder shown in FIG. 9F, a +-shaped cylinder, or a C-shaped cylinder. In the present disclosure, a shape of the pillar 152 refers to a shape of an orthographic projection of the pillar 152 on the base 151.

In at least one embodiment, the photonic crystal surface-emitting laser device 1 may be a flip-chip structure. After the buffer layer 11, the first cladding layer 12, the light emitting layer 13, and the photonic crystal layer 14 are grown on the surface of the substrate 10, the photonic crystal surface-emitting laser device 1 is inverted and carried by a flip chip substrate 200, and the metasurface 15 is formed on the surface of the substrate 10 facing away from the photonic crystal layer 14. In at least one embodiment, the substrate 10 may be thinned first, and then the metasurface 15 is formed. In at least one embodiment, a thickness of the substrate 10 after being thinned is 10% to 90% of a thickness of the substrate 10 before being thinned, preferably, the thickness of the substrate 10 after being thinned is 20% to 70% of the thickness of the substrate 10 before being thinned. Thinning the substrate 10 is beneficial to heat dissipation. Further, since the laser light needs to pass through the substrate 10 before being emitted, thinning the substrate 10 is also beneficial to reduce an absorption of the laser light by the substrate 10 and reduce the loss of the laser light.

Referring to FIG. 3, in at least one embodiment, the photonic crystal surface-emitting laser device 1 may further include a first transparent conductive layer 161 and a second transparent conductive layer 162. The first transparent conductive layer 161 is located on a surface of the metasurface 15 facing away from the photonic crystal layer 14, the second transparent conductive layer 162 is located on a surface of the photonic crystal layer 14 facing away from the substrate 10. Both the first transparent conductive layer 161 and the second transparent conductive layer 162 are made of indium tin oxide (ITO). The first transparent conductive layer 161 and the second transparent conductive layer 162 are configured to diffuse current, so that the current distribution is more uniform.

In at least one embodiment, the first transparent conductive layer 161 covers the first surface of the base 151 with the pillars 152, and fills spaces between any two pillars 152. A thickness of the first transparent conductive layer 161 is less than a height of each of the pillars 152, so that the pillars 152 protrude from the first transparent conductive layer 161. That is, each of the spaces between any two pillars 152 is not completely filled by the first transparent conductive layer 161.

Therefore, when the laser light is incident from the photonic crystal layer 14 into the metasurface 15, the laser light needs to pass through two dielectric layers with different refractive indices successively. In at least one embodiment, the two dielectric layers with different refractive indices are defined as a first dielectric layer 153 and a second dielectric layer 154. The first dielectric layer 153 is a dielectric layer composed of a portion of the pillars 152 combined with the first transparent conductive layer 161 and the first transparent conductive layer 161. The laser light has a first deflection angle $\alpha 1$ after passing through the first dielectric layer 153. The second dielectric layer 154 is a dielectric layer composed of a portion of pillars 152 not combined with the first transparent conductive layer 161 and air. The laser light has a second deflection angle $\alpha 2$ after passing through the second dielectric layer 154. The laser light passes through the two dielectric layers with different refractive indices and undergoes two angular deflections, so that a deflection angle of the laser light finally emitted by the photonic crystal surface-emitting laser device 1 is the sum of the angular deflections, that is, $\alpha 1 + \alpha 2$.

The first transparent conductive layer 161 fills the spaces between the pillars 152 which is beneficial to increase the deflection angle of the laser light finally emitted by the photonic crystal surface-emitting laser device 1, so that the laser light finally emitted has a larger deflection angle range. As a result, when the photonic crystal surface-emitting laser device 1 is applied in the optical system 100, the optical system 100 has a larger detection range.

In at least one embodiment, the photonic crystal surface-emitting laser device 1 may further include a first electrode 171 and a second electrode 172. The first electrode 171 is located on a side of the substrate 10 facing away from the photonic crystal layer 14, and is in electrical contact with the first transparent conductive layer 161. The second electrode 172 is located on a surface of the second transparent conductive layer 162 facing away from the photonic crystal layer 14, and is in electrical contact with the second transparent conductive layer 162. The first electrode 171 and the second electrode 172 are configured to be electrically connected to the control device 2 to receive the driving signal. The first electrode 171 and the second electrode 172 are metals, such as titanium (Ti), germanium (Ge), nickel (Ni), gold (Au), platinum (Pt) or alloys thereof. In at least one embodiment, the first electrode 171 is n-type electrode, the second electrode 172 is p-type electrode.

When driving signals are applied to the first electrode 171 and the second electrode 172 respectively (the driving signal applied to the first electrode 171 and the driving signal applied to the second electrode 172 are different), the driving current is injected from the side of the photonic crystal layer 14 facing the transparent substrate 10. The light emitting layer 13 is driven by the driving current to generate photons. The photons generated by the light emitting layer 13 are incident into the photonic crystal layer 14 and generate a Bragg diffraction oscillation in the photonic crystal layer 14, and when the photonic crystal surface-emitting laser device 1 reaches a balance state of gain and loss, laser light is generated. The laser light incident into the metasurface 15 is diffracted by the metasurface 15 with a specific structure, and then emitted by the metasurface 15 in a specific shape and a specific angle.

In at least one embodiment, the photonic crystal surface-emitting laser device 1 may further include insulating layers 18. Each of the insulating layers 18 may be made of silicon nitride ($SiN_x$), silicon dioxide ($SiO_2$), or polymethyl methacrylate (PMMA). One of the insulating layers 18 is located between the substrate 10 and the first electrode 171, the other is located between the second electrode 172 and the photonic crystal layer 14. The insulating layers 18 are mainly arranged on peripheries of the first electrode 171, the second electrode 172, the substrate 10, and the photonic crystal layer 14 to protect each layer in the photonic crystal surface-emitting laser device 1.

The above photonic crystal surface-emitting laser device 1 and the optical system 100 include the metasurface 15, and the metasurface 15 includes the base 151 and the plurality of pillars 152 arranged on the base 151 at intervals. At least two of the plurality of pillars 152 have different shapes and/or different sizes. The metasurface 15 is used for receiving laser light, diffracting the laser light and then emitting it. By setting the shapes, the sizes, and the quantity of the plurality of pillars 152, the expected emission angle of the laser light may be obtained, and the number of the light spots formed by the laser light and the sizes of the light spots formed by the laser light may be controlled.

That is, the above photonic crystal surface-emitting laser device 1 and the optical system 100 may realize not only the deflection of the laser light but also shaping the laser light through the metasurface 15, which is beneficial to realize the diversified control of the laser light.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A photonic crystal surface-emitting laser device comprising:
   a substrate;

a light emitting layer located on a surface of the substrate and configured to generate photons;

a photonic crystal layer located on a side of the light emitting layer facing away from the substrate, wherein the photons incident into the photonic crystal layer generate laser light through a Bragg diffraction oscillation; and a metasurface located on a side of the substrate facing away from the photonic crystal layer;

wherein the metasurface comprises a base and a plurality of pillars arranged on a surface of the base at intervals, at least two of the plurality of pillars have different shapes and/or different sizes, the metasurface is configured to receiving the laser light, diffracting the laser light and then emitting the laser light, the photonic crystal surface-emitting laser device further comprises a first transparent conductive layer, the first transparent conductive layer covers the surface of the base with the pillars, and the first transparent conductive layer fills spaces between any two pillars.

2. The photonic crystal surface-emitting laser device of claim 1, wherein distances between any two adjacent of the plurality of pillars are the same.

3. The photonic crystal surface-emitting laser device of claim 1, wherein a distance between two adjacent of the plurality of pillars and a distance between another two adjacent of the plurality of pillars are different.

4. The photonic crystal surface-emitting laser device of claim 1, wherein the metasurface comprises a plurality of diffraction units, each of the plurality of diffraction units comprises at least one of the plurality of pillars, when each of the plurality of diffraction units comprises at least two of the plurality of pillars, the at least two of the plurality of pillars in each of the plurality of diffraction units have different shapes and/or different sizes.

5. The photonic crystal surface-emitting laser device of claim 1, wherein a thickness of the first transparent conductive layer is less than a height of each of the pillars.

6. The photonic crystal surface-emitting laser device of claim 1, wherein the photonic crystal layer comprises a first photonic crystal region and a second photonic crystal region surrounding the first photonic crystal region;

the photons incident into the photonic crystal layer to generate a Bragg diffraction oscillation in the first photonic crystal region; the second photonic crystal region is configured to reflect the photons to the first photonic crystal region.

7. The photonic crystal surface-emitting laser device of claim 6, wherein an orthographic projection of the first photonic crystal region on the substrate is a rectangle, a hexagon or a circle, an orthographic projection of the second photonic crystal region on the substrate is a rectangular frame surrounding the rectangle, a hexagonal frame surrounding the hexagon, or an annular frame surrounding the circle.

8. The photonic crystal surface-emitting laser device of claim 6, wherein a plurality of first through holes arranged at intervals are defined in the first photonic crystal region, a plurality of second through holes arranged at intervals are defined in the second photonic crystal region, each of the plurality of first through holes is different from each of the plurality of second through holes.

9. The photonic crystal surface-emitting laser device of claim 1, wherein the metasurface and the substrate are made of the same material.

10. The photonic crystal surface-emitting laser device of claim 1, wherein the photonic crystal surface-emitting laser device further comprises a second transparent conductive layer, the second transparent conductive layer is located on a surface of the photonic crystal layer facing away from the substrate to diffuse current.

11. An optical system comprising:

a control device; and a plurality of photonic crystal surface-emitting laser devices, each of the plurality of photonic crystal surface-emitting laser devices electrically connected to the control device, and the control device configured to output a driving signal to control each of the plurality of photonic crystal surface-emitting laser devices to be in an on state or in an off state, each of the plurality of photonic crystal surface-emitting laser devices comprising:

a substrate;

a light emitting layer located on a surface of the substrate and configured to generate photons under the driving of the driving signal;

a photonic crystal layer located on a side of the light emitting layer facing away from the substrate, wherein the photons incident into the photonic crystal layer generate laser light through a Bragg diffraction oscillation; and a metasurface located on a side of the substrate facing away from the photonic crystal layer;

wherein the metasurface comprises a base and a plurality of pillars arranged on a surface of the base at intervals, at least two of the plurality of pillars have different shapes and/or different sizes, the metasurface is configured to receiving the laser light, diffracting the laser light and then emitting the laser light, the photonic crystal surface-emitting laser device further comprises a first transparent conductive layer; the first transparent conductive layer covers the surface of the base with the pillars, and the first transparent conductive layer fills spaces between any two pillars.

12. The optical system of claim 11, wherein distances between any two adjacent of the plurality of pillars are the same, or a distance between two adjacent of the plurality of pillars and a distance between another two adjacent of the plurality of pillars are different.

13. The optical system of claim 11, wherein the metasurface comprises a plurality of diffraction units, each of the plurality of diffraction units comprises at least one of the plurality of pillars, when each of the plurality of diffraction units comprises at least two of the plurality of pillars, the at least two of the plurality of pillars in each of the plurality of diffraction units have different shapes and/or different sizes.

14. The optical system of claim 11, wherein a thickness of the first transparent conductive layer is less than a height of each of the pillars.

15. The optical system of claim 11, wherein the photonic crystal layer comprises a first photonic crystal region and a second photonic crystal region surrounding the first photonic crystal region;

the photons incident into the photonic crystal layer generate a Bragg diffraction oscillation in the first photonic crystal region; the second photonic crystal region is configured to reflect the photons to the first photonic crystal region.

16. The photonic crystal surface-emitting laser device of claim 15, wherein an orthographic projection of the first photonic crystal region on the substrate is a rectangle, a hexagon or a circle, an orthographic projection of the second photonic crystal region on the substrate is a rectangular frame surrounding the rectangle, a hexagonal frame surrounding the hexagon, or an annular frame surrounding the circle.

17. The optical system of claim 15, wherein a plurality of first through holes arranged at intervals are defined in the first photonic crystal region, a plurality of second through holes arranged at intervals are defined in the second photonic crystal region, each of the plurality of first through holes is different from each of the plurality of second through holes.

18. The optical system of claim 11, wherein the photonic crystal surface-emitting laser device further comprises a second transparent conductive layer, the second transparent conductive layer is located on a surface of the photonic crystal layer facing away from the substrate to diffuse current.

* * * * *